(12) United States Patent
Nayak et al.

(10) Patent No.: US 12,542,950 B2
(45) Date of Patent: Feb. 3, 2026

(54) PERSONALIZED RECOMMENDATIONS FOR TELEVISION SPORTS CONTENT

(71) Applicant: GOOGLE LLC, Mountain View, CA (US)

(72) Inventors: Shravan Nayak, Bangalore (IN); Tamojit Chatterjee, Shyamnagar (IN); Fahad Fayyaz Durrani, Richmond (GB); Nikhilesh Tripathi, Bangalore (IN); Kanishka Mishra, Bangalore (IN); Sundaramoorthy Murugesan, Bangalore (IN); Venkata Gangadhar Kanchu, Bangalore (IN); Priyanshi Sharma, Greater Noida (IN); Kopal Niranjan, Bangalore (IN)

(73) Assignee: GOOGLE LLC, Mountain View, CA (US)

( * ) Notice: Subject to any disclaimer, the term of this patent is extended or adjusted under 35 U.S.C. 154(b) by 64 days.

(21) Appl. No.: 18/441,794

(22) Filed: Feb. 14, 2024

(65) Prior Publication Data
US 2025/0260870 A1    Aug. 14, 2025

(51) Int. Cl.
*H04N 21/466* (2011.01)
*H04N 21/482* (2011.01)
(52) U.S. Cl.
CPC ..... *H04N 21/4668* (2013.01); *H04N 21/4826* (2013.01)
(58) Field of Classification Search
None
See application file for complete search history.

(56) References Cited

U.S. PATENT DOCUMENTS

| | | | |
|---|---|---|---|
| 6,851,090 B1 * | 2/2005 | Gutta | H04N 21/4532 348/E7.061 |
| 7,051,352 B1 * | 5/2006 | Schaffer | H04N 7/163 706/45 |
| 8,949,874 B1 | 2/2015 | Li et al. | |
| 11,336,946 B1 | 5/2022 | Gheen | |

(Continued)

OTHER PUBLICATIONS

"Making TV More Personal", Videonet | Issue 24 | www.v-net.tv, 22 pages.

(Continued)

*Primary Examiner* — James R Marandi
(74) *Attorney, Agent, or Firm* — Brake Hughes Bellermann LLP

(57) ABSTRACT

According to an aspect, a method may generate an activity timeline of a user based on data indicative of a search history, a watch history, and activity of the user with a television application. The method may generate a sports score using a sports model based on the activity timeline of the user, may generate a ranked list of sports related media content items for recommending to the user based on the sports score, and may associate a respective selectable information item with each of the sports related media content items included in the ranked list. The method may send, to a network-connected display device, the ranked list of sports related media content items that includes each respective selectable information item for displaying each respective selectable information item in a user interface of the television application executing on the network-connected display device.

20 Claims, 9 Drawing Sheets

(56) References Cited

U.S. PATENT DOCUMENTS

| | | |
|---|---|---|
| 11,659,225 B2 | 5/2023 | Anguiano |
| 11,853,342 B2 | 12/2023 | Chen |
| 11,861,905 B2 | 1/2024 | Chan et al. |
| 2007/0078849 A1 | 4/2007 | Slothouber |
| 2007/0157220 A1 | 7/2007 | Cordray et al. |
| 2007/0157222 A1 | 7/2007 | Cordray et al. |
| 2007/0157223 A1 | 7/2007 | Cordray et al. |
| 2007/0157242 A1 | 7/2007 | Cordray et al. |
| 2007/0157247 A1 | 7/2007 | Cordray et al. |
| 2010/0251304 A1 | 9/2010 | Donoghue et al. |
| 2011/0083069 A1 | 4/2011 | Paul et al. |
| 2011/0153612 A1 | 6/2011 | Paul et al. |
| 2013/0204825 A1* | 8/2013 | Su .................... G06N 5/02 706/46 |
| 2013/0303267 A1 | 11/2013 | Vasquez et al. |
| 2013/0304820 A1 | 11/2013 | Vasquez et al. |
| 2013/0305158 A1 | 11/2013 | Vasquez et al. |
| 2014/0053190 A1 | 2/2014 | Sirpal |
| 2014/0053198 A1 | 2/2014 | Sirpal et al. |
| 2014/0068689 A1 | 3/2014 | Sirpal et al. |
| 2014/0279852 A1 | 9/2014 | Chen |
| 2016/0117727 A1 | 4/2016 | Campbell et al. |
| 2016/0226984 A1 | 8/2016 | Kelly et al. |
| 2016/0227283 A1 | 8/2016 | Kelly et al. |
| 2017/0332119 A1 | 11/2017 | Casagrande |
| 2018/0005131 A1 | 1/2018 | Yin et al. |
| 2018/0027272 A1* | 1/2018 | Raj .................. H04N 21/23424 725/34 |
| 2018/0192130 A1 | 7/2018 | Liston et al. |
| 2019/0354765 A1 | 11/2019 | Chan et al. |
| 2020/0050432 A1 | 2/2020 | Das et al. |
| 2021/0089779 A1 | 3/2021 | Chan et al. |
| 2021/0142066 A1 | 5/2021 | Jayaram et al. |
| 2021/0306711 A1 | 9/2021 | Ellingford et al. |
| 2023/0224540 A1* | 7/2023 | Kodali .................. G06Q 40/03 725/34 |

OTHER PUBLICATIONS

Bar, "Personalized TV: the Linear TV Experience is Evolving", https://www.harmonicinc.com/insights/blog/personalized-tv/, Nov. 5, 2021, 12 pages.

Cardoso, et al., "TV Personalisation: Blending Linear and On-Demand Content in the Living Room", https://www.inderscienceonline.com/doi/abs/10.1504/IJENTTM.2021.116769, Jul. 16, 2021, 3 pages.

* cited by examiner

PERSONALIZED RECOMMENDATIONS FOR TELEVISION SPORTS CONTENT

BACKGROUND

A television (TV) application may present various types of media content of interest to a user. The media content may have different formats such as streaming video and audio. The types of media content may include, but are not limited to, movies, television shows, live sporting events, news items, short form videos, and music. In addition, or in the alternative, a variety of media content providers may deliver various types of media content for viewing by the user. The TV application may deliver a customized viewing experience to a user that spans the diverse types of media content provided by the variety of media content providers.

SUMMARY

In some non-limiting examples, a system may determine an interest of a user in viewing sports related media content on a television. The system may use information and data related to the interest of the user in viewing sports related media content to recommend sports related content (e.g., live sporting events) for viewing by the user on the television set. For example, the system may determine interests of a user in sports related media content using information and data obtained from multiple sources. The system may implement an infrastructure that uses the information and data obtained from the multiple sources to determine an interest of the user in sports related media content. In some implementations, the information and data may be categorized into multiple sports related categories that may include, for example, a sports type, a sports team, and/or a sports league.

The system may train machine learning models for use by an artificial intelligence (AI) engine to determine an interest of the user in sports related media content. For example, the system may train the machine learning models based on the activities and interaction of the user with the multiple sources such as web browsers and applications. The machine learning model may generate a sports score for each sports related category as related to the activities of the user. A sports score may indicate an interest or affinity of the user for sports related media content included in that category. The system may rank the sports scores and base recommendations for sports related media content of interest to the user on the ranked sports scores. Basing sports related media content recommendations on an affinity of the user for sports and sports related content may provide personalized recommendations for sports related media content to a user enhancing the user experience when viewing the media content on a television.

In some aspects, the techniques described herein relate to a method including: generating, by a server computer, an activity timeline of a user based on data indicative of a search history of the user, data indicative of a watch history of the user, and data indicative of activity of the user with a television application; generating a sports score using a sports model based on the activity timeline of the user; generating a ranked list of sports related media content items for recommending to the user based on the sports score; associating a respective selectable information item with each of the sports related media content items included in the ranked list; and sending, to a network-connected display device, the ranked list of sports related media content items that includes each respective selectable information item for displaying each respective selectable information item in a user interface of the television application executing on the network-connected display device.

In some aspects, the techniques described herein relate to a method, further including generating a television (TV) application sports model using the activity timeline of the user.

In some aspects, the techniques described herein relate to a method, further including generating a general sports model using the activity timeline of the user.

In some aspects, the techniques described herein relate to a method, wherein the sports model includes the TV application sports model and the general sports model.

In some aspects, the techniques described herein relate to a method, wherein the TV application sports model includes a sports affinity model and a sports mixing model.

In some aspects, the techniques described herein relate to a method, wherein the sports affinity model models an affinity of the user for sports related categories.

In some aspects, the techniques described herein relate to a method, wherein the sports related categories include a type of sport, a team, and a league.

In some aspects, the techniques described herein relate to a method, further including inter-ranking sports related media content items using the sports affinity model, the inter-ranking including: determining, for each sports related media content item, attributes of the sports related media content item that are associated with the sports related categories; and mapping the attributes to a range representative of a user affinity for the sports related media content item.

In some aspects, the techniques described herein relate to a method, wherein the mapping includes applying an inter-ranking process that normalizes affinity scores obtained from media content providers of the sports related media content items.

In some aspects, the techniques described herein relate to a method, further including selecting media content for a sporting event for recommending to the user based on the inter-ranking.

In some aspects, the techniques described herein relate to a method, wherein the sports mixing model models an affinity of the user for mixing sports related media content items with non-sports related media content items.

In some aspects, the techniques described herein relate to a method, further including co-ranking sports related media content items with non-sports related media content items using the sports mixing model, the co-ranking including applying a co-ranking process that normalizes affinity scores obtained from media content providers of the sports related media content items and the non-sports related media content items.

In some aspects, the techniques described herein relate to a method, further including receiving, by the server computer and from a logging pipeline, data indicative of the activity of the user with the television application.

In some aspects, the techniques described herein relate to a method, wherein the logging pipeline determines the data indicative of the activity of the user from a user log received from the network-connected display device.

In some aspects, the techniques described herein relate to a non-transitory computer-readable medium storing executable instructions that when executed by at least one processor of a server computer cause the at least one processor to execute operations, the operations including: generating an activity timeline of a user based on data indicative of a search history of the user, data indicative of a watch history of the user, and data indicative of activity of the user with a television application; generating a sports score using a sports model based on the activity timeline of the user; generating a ranked list of sports related media content items for recommending to the user based on the sports score; associating a respective selectable information item with each of the sports related media content items included in the ranked list; and sending, to a network-connected display device, the ranked list of sports related media content items that includes each respective selectable information item for displaying each respective selectable information item in a user interface of the television application executing on the network-connected display device.

In some aspects, the techniques described herein relate to a non-transitory computer-readable medium, further including generating a television (TV) application sports model using the activity timeline of the user.

In some aspects, the techniques described herein relate to a non-transitory computer-readable medium, further including generating a general sports model using the activity timeline of the user.

In some aspects, the techniques described herein relate to a non-transitory computer-readable medium, wherein the sports model includes the TV application sports model and the general sports model.

In some aspects, the techniques described herein relate to a non-transitory computer-readable medium, wherein the TV application sports model includes a sports affinity model that models an affinity of the user for sports related categories, and a sports mixing model.

In some aspects, the techniques described herein relate to a system including: at least one processor; and a non-transitory computer-readable medium storing instructions that when executed by the at least one processor cause the system to: generate an activity timeline of a user based on data indicative of a search history of the user, data indicative of a watch history of the user, and data indicative of activity of the user with a television application; generate a sports score using a sports model based on the activity timeline of the user; generate a ranked list of sports related media content items for recommending to the user based on the sports score; associate a respective selectable information item with each of the sports related media content items included in the ranked list; and send, to a network-connected display device, the ranked list of sports related media content items that includes each respective selectable information item for displaying each respective selectable information item in a user interface of the television application executing on the network-connected display device.

The details of one or more implementations are set forth in the accompanying drawings and the description below. Other features will be apparent from the description and drawings, and from the claims.

DETAILED DESCRIPTION

Figure 1A:
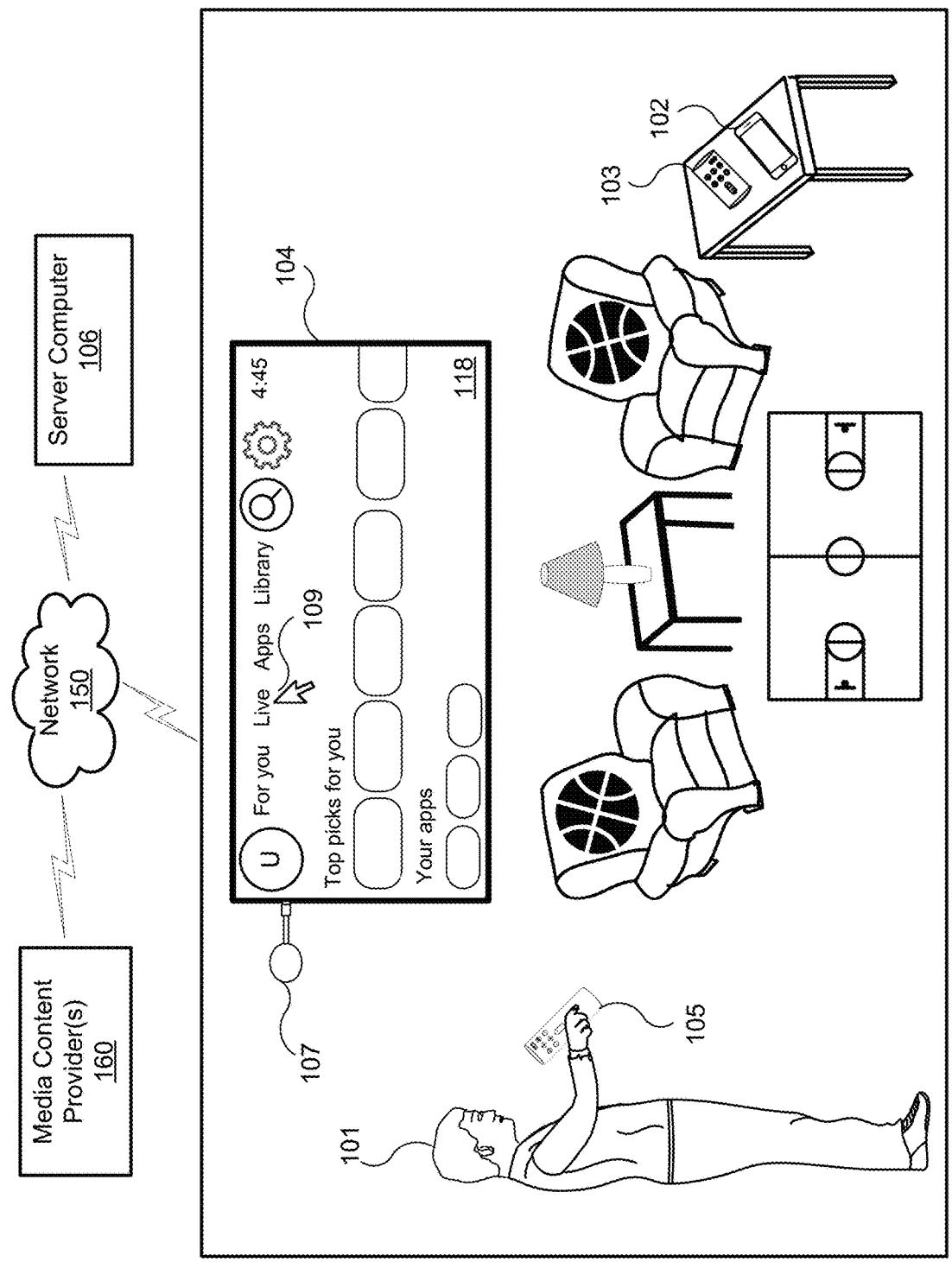
FIG. 1A illustrates an example of a user interacting with a network-connected display device and a media adapter, according to implementations described throughout this disclosure.

In some non-limiting examples, a system may determine an interest of a user in viewing sports related media content on a television. The system may use information and data related to the interest of the user in viewing sports related media content to recommend sports related content (e.g., live sporting events) for viewing by the user on the television set. For example, a television application may determine an interest of a user in sports related media content using information and data obtained from multiple sources. The multiple sources may include but are not limited to a search activity or search history of a user with a web browser application, a watch history or activity of a user for short form videos, shared videos, and other types of personalized media content provided by a variety of media content providers, and activities of the user when interacting with the television (TV) application.

In some implementations, the television may be a smart television and the TV application may be executing on the smart television. In some implementations, a media adapter may interface with the television. The media adapter may interface with a server computer that may execute a server-side television application.

The system may implement an infrastructure for use in determining an interest of a user in sports related media content that may include, but is not limited to, three sports related categories: a sports type (e.g., football, baseball, basketball, soccer, etc.); a sports team (e.g., the New England Patriots, the Boston Red Sox, the Boston Celtics, the New England Revolution, etc.); and a sports league (e.g., the National Football League (NFL), Major League Baseball (MLB), National Basketball Association (NBA), and Major League Soccer (MLS), etc.).

The system may train machine learning models for use by an artificial intelligence (AI) engine to determine an interest of the user in sports related media content. For example, the system may train the machine learning models based on the activities or search history of the user with search engines, web browsers, video sharing websites, media content provider applications, and/or television applications. The machine learning model may generate a sports score for each sports related category as related to the activities of the user. A sports score may indicate an interest or affinity of the user for sports related media content included in that category. For example, a sports score may be a sports team score indicating an interest of a user in a sports team. For example, a sports score may be a sports type score indicating an interest of a user in a sports type. For example, a sports score may be a sports league score indicating an interest of a user in a sports league.

The system may rank the sports scores. The system may base sports related media content recommendations to a user on the ranked sports scores. For example, the system may provide sports related media content recommendations for live sports television. In another example, the system may provide sports related media content recommendations for live sports television and other live television offerings. In another example, the system may provide sports related media content recommendations for live sports television and pre-recorded on demand sports television.

The disclosure generally relates to systems and methods for recommending and ranking sports related media content for live television viewing by a user. In some implementations, live sports related media content may be ranked and recommended relative to one another and may be provided by multiple different media content providers. This may be referred to as inter-ranking of sports related media content for live TV viewing by a user. In some implementations, live sports related media content may be ranked and recommended relative to and along with live non-sports related media content. The sports related media content and the non-sports related media content may be provided or sourced by a variety of different media content providers. This may be referred to as co-ranking of sports related media content with non-sports related media content for live TV viewing by a user.

In some implementations, sports related media content for live television viewing may be ranked and recommended relative to sports related media content that is available on demand or that is pre-recorded and available for replay (e.g., not live). In some implementations, the recommended media content may be provided or sourced by a variety of different media content providers. In some implementations, sports related media content for live television viewing may be ranked and recommended relative to sports related media content that is available on demand. In some implementations, the recommended media content may be provided or sourced by a variety of different media content providers.

Inter-ranking of media content for viewing by a user may refer to the ranking of sports related media content across different delivery sources or providers and across different delivery methods (e.g., live content, on demand content, prerecorded content, etc.). At least one technical problem may be how to compare user affinity for the sports related media content as each delivery source may score or rank the sports related media content they provide using different provider models. For example, a television application may use the determined user affinity for sports related media content to provide recommendations for sports related media content for viewing by the user. At least one technical solution may implement an inter-ranking algorithm that uses an inter-ranking model that normalizes the scores from each provider model so that the scores can be compared and used to determine a user affinity for the sports related media content.

The disclosed systems and methods may determine scores for each of the sports related categories based on the activities or search history of the user when interacting with search engines, web browsers, video sharing websites, media content provider applications, and/or television applications. The scores may be used to inter-rank sports related media content for live TV viewing by a user.

In addition, or in the alternative, the disclosed systems and methods may determine an affinity of a user for non-sports related media content as well as an affinity of the user for sports related media content. For example, the disclosed systems and methods may determine an affinity of the user for non-sports related media content based on user interactions with a television application. The television application may determine interests of a user in the non-sports related media content using information and data obtained from multiple sources. The multiple sources may include but are not limited to a search activity or search history of a user with a web browser application, a watch history of a user for short form videos, shared videos, and other types of personalized media content provided by a variety of media content providers, and activities of the user when interacting with the television (TV) application.

In some implementations, the disclosed systems and methods may co-rank sports related media content with non-sports related media content. Multiple different media content providers may source or provide the sports related media content and the non-sports related media content. At least one technical problem may be how to compare user affinity for sports related media content to non-sports related media content (e.g., live content, on demand content, pre-recorded content, etc.) across different sources or providers and across different delivery methods with each provider using a different provider model for measuring and ranking media content. At least one technical solution may implement a co-ranking algorithm that uses a co-ranking model that normalizes the scores from each provider model for the sports related media content and the non-sports related media content. The co-ranking algorithm may further map the normalized score into at least two ranges (e.g., three ranges: low, medium, high). The range the media content item is mapped to may determine how it is ranked for recommendation to the user. The co-ranking algorithm may merge information and data related to the affinity of the user for non-sports related media content with an affinity of the user for sports related media content to co-rank and recommend live media content for viewing by the user that includes both sports related media content and non-sports related media content.

A technical effect may be the ability to compare user affinity scores for different types of media content (e.g., sports related media content and non-sports related media content) across different media content providers using different user affinity scoring models and across different delivery methods. The technical effect of the comparison may result in an improved user experience by providing the user with personalized recommendations for sports related media content that may also take into consideration the user affinity for non-sports related media content.

Figure 1B:
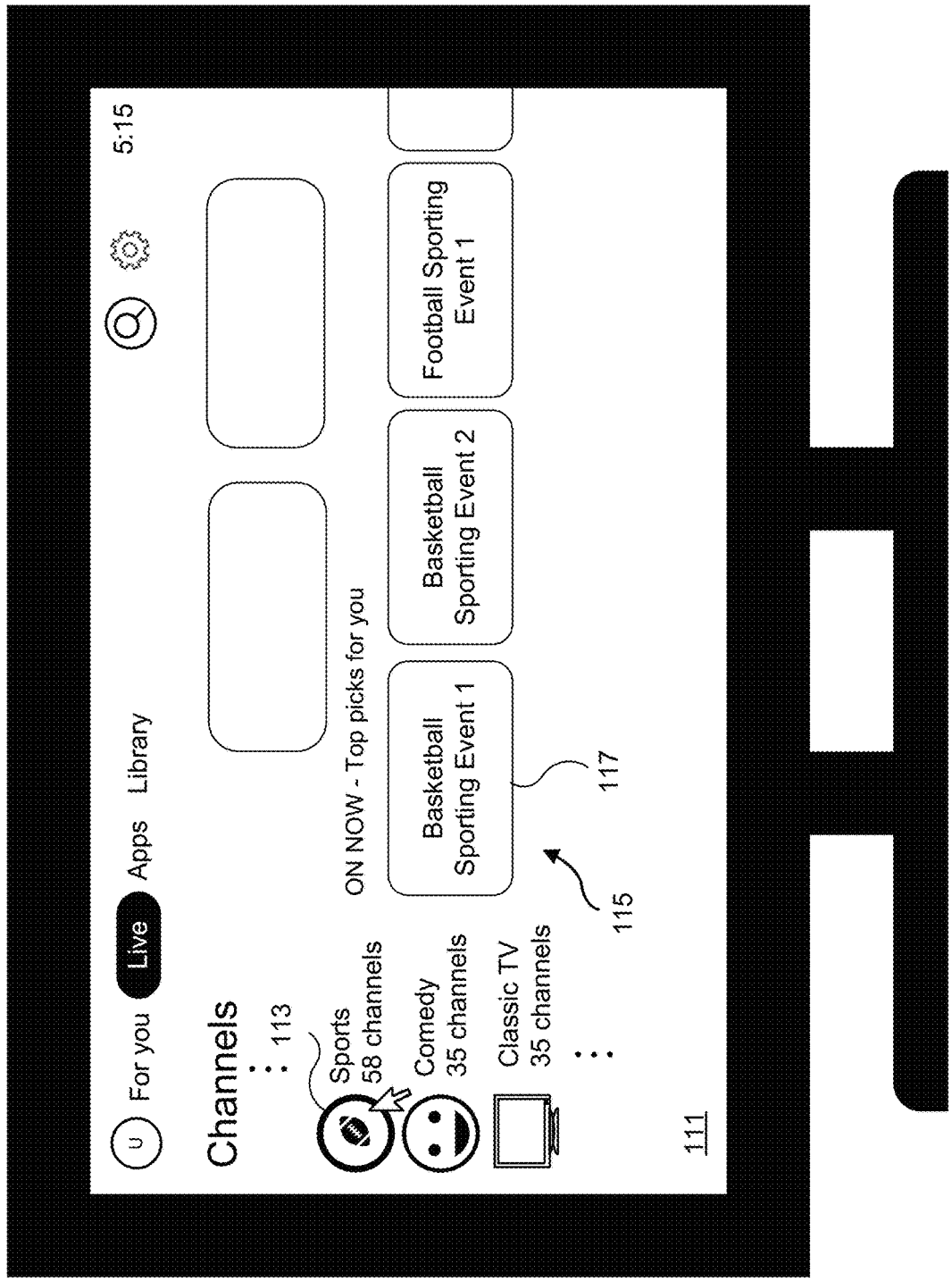
FIG. 1B illustrates an example user interface for a television application that provides recommended inter-ranked sports related media content items for viewing on a network-connected display device according to implementations described throughout this disclosure.
Figure 1C:
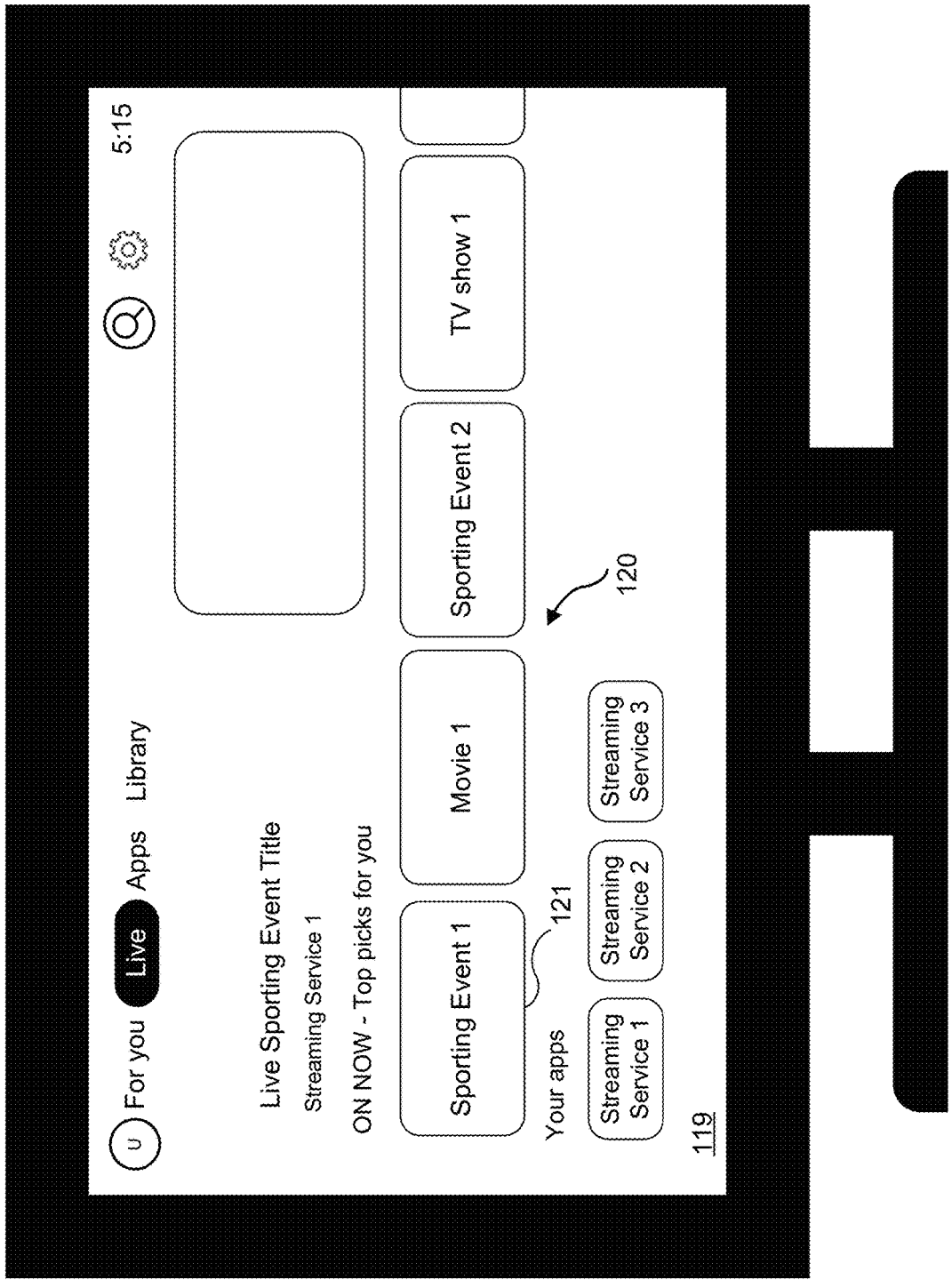
FIG. 1C illustrates an example user interface for a television application that provides recommended sports related media content items co-ranked with recommended non-sports related media content for viewing on a network-connected display device according to implementations described throughout this disclosure.
Figure 1D:
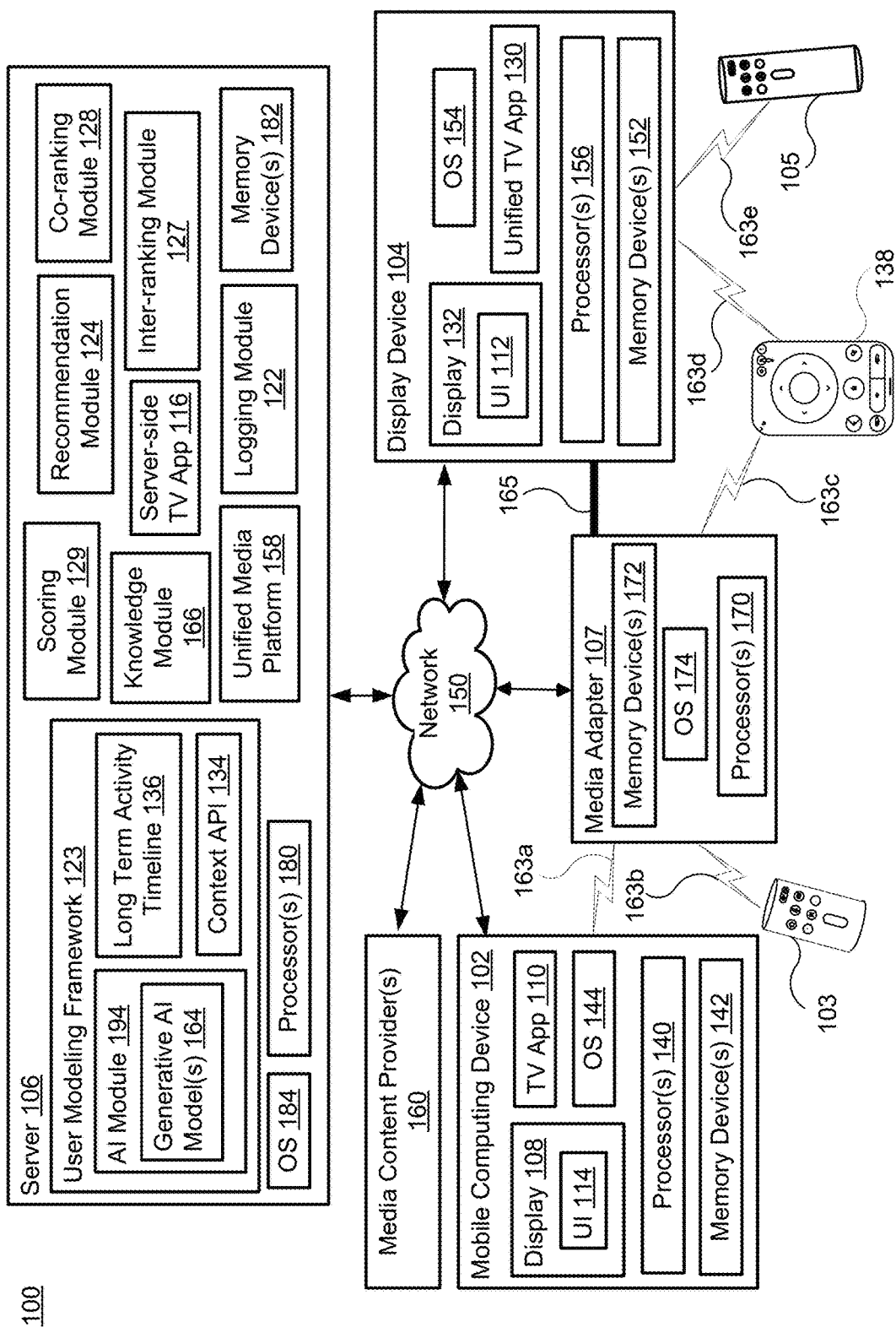
FIG. 1D illustrates an example system for determining and providing sports related media content items for recommendation to a user of a television application, according to implementations described throughout this disclosure.

FIG. 1A illustrates an example of a user 101 interacting with a network-connected display device 104 and a media adapter 107, according to implementations described throughout this disclosure. FIG. 1B illustrates an example user interface for a television application that provides recommended inter-ranked sports related media content items for viewing on a network-connected display device according to implementations described throughout this disclosure. FIG. 1C illustrates an example user interface for a television application that provides recommended sports related media content items co-ranked with non-sports related media content for viewing on a network-connected display device according to implementations described throughout this disclosure. FIG. 1D illustrates an example system for determining and providing sports related media content items for recommendation to a user of a television application, according to implementations described throughout this disclosure.

Referring to FIGS. 1A and 1D, the network-connected display device 104 may communicate with a server computer 106 and media content providers 160 by way of a network 150. The media content providers 160, the network-connected display device 104, the server computer 106, and a mobile computing device 102 may interact with and communicate with one other by way of the network 150. In some implementations, the mobile computing device 102 may interface or connect to the media adapter 107 and/or the network-connected display device 104 by way of a wireless communication link that may be a short-range wireless connection such as, for example a Bluetooth connection or a Wi-Fi (e.g., direct Wi-Fi) connection.

In some implementations, the user 101 may connect to and interact with the media adapter 107 by way of the network-connected display device 104 using a server-side television (TV) application 116 installed on the server computer 106. The media adapter 107 may be connected or interfaced to the network-connected display device 104. The network-connected display device 104 may be communicatively coupled or connected to the server computer 106 by way of the network 150. In these implementations, a unified media platform (UMP) 158 may provide or serve media content items from the media content providers 160 to the network-connected display device 104 by way of the media adapter 107.

In some implementations, the user 101 may interact with the network-connected display device 104 using a remote control device 105. In some implementations, a television (TV) application 110 may render a virtual remote control 138 in a user interface (e.g., the UI 114) on a display (e.g., the mobile computing device display 108) on the mobile computing device 102. The virtual remote control 138 may allow the mobile computing device 102 to act as a remote control for the network-connected display device 104. The TV application 110 may render the virtual remote control 138 for use with the network-connected display device 104. The user may interact with the remote control device 105 and/or the virtual remote control 138 when interacting with a user interface (e.g., user interface (UI) 118) provided by a unified television application 130 on a display 132 of the network-connected display device 104 and/or when selecting media content for viewing on the network-connected display device 104.

In some implementations, the user 101 may connect to and interact with the media adapter 107 using the television (TV) application 110 installed on the mobile computing device 102. In some implementations, the user 101 may connect to and interact with the media adapter 107 using a media adapter remote control device 103. In some implementations, the TV application 110 may render the virtual remote control 138 for use with the media adapter 107. The virtual remote control 138 may allow the mobile computing device 102 to act as a remote control for the media adapter 107. The user 101 may interact with the virtual remote control 138 and/or the media adapter remote control device 103 when interacting with the media adapter 107.

The network-connected display device 104 may execute the unified television application 130. The unified television application 130 may interface with a server-side television (TV) application 116. The unified television application 130 may present a user interface (UI) 112 on a display 132 included in the network-connected display device 104.

The unified television application 130 may present a user interface 118 on the display 132 in response to the user 101 launching the unified television application 130. The user 101 may click on or select a live option 109. In some implementations, referring to FIGS. 1B and 1D, in response to the selection of the live option 109 the unified television application 130 may provide a user interface 111 on the display 132 of the network-connected display device 104. The user interface 111 may provide the user 101 with selectable options for live TV viewing. For example, the user 101 may select or click on a sports option 113. In response, the unified television application 130 may interface with the server-side TV application 116 to provide an inter-ranked list of recommended sporting events for viewing by the user 101. The user interface 111 may present the inter-ranked recommended live sporting events as a ranked list of recommended media content items in a row 115 in the user interface 111 (e.g., "On Now-Top Picks For You"). For example, the row 115 may include, for each media content recommendation, an area or slot (e.g., slot 117) that includes a visual representation of the media content recommendation along with a link to the recommended media content item. As will be described in more detail herein, the inter-ranked recommended live sporting events may be inter-ranked based on an affinity of the user for a sport type, a sports team, and/or a sports league.

In some implementations, referring to FIGS. 1C and 1D, in response to the selection of the live option 109 the unified television application 130 may provide a user interface 119 on the display 132 of the network-connected display device 104. The user interface 119 may provide the user 101 with selectable options for live TV viewing. For example, the unified television application 130 may interface with the server-side TV application 116 to provide a co-ranked list of media content items that includes sports related media content and non-sports related media content for recommending for viewing by the user 101 based, for example, on an affinity of the user for both sports related media content and non-sports related media content. The user interface 119 may present the co-ranked recommended media content as a list of recommended media content items in a row 120 in the user interface 119 (e.g., "On Now-Top Picks For You"). For example, the row 120 may include, for each media content recommendation, an area or slot (e.g., slot 121) that includes a visual representation of the media content recommendation along with a link to the recommended media content item. As will be described in more detail herein, the co-ranked recommended media content may be co-ranked based on an affinity of the user for sports related media content and non-sports related media content.

Referring to FIG. 1D, the mobile computing device 102 may be configured to execute the TV application 110. The mobile computing device 102 may include the mobile computing device display 108 configured to display the UI 114. A user may interact with the UI 114 to set up, control, and interact with the TV application 110. In some implementations, as described, the TV application 110 may display the virtual remote control 138 in the UI 114 allowing the user 101 to interact with and control the network-connected display device 104.

The mobile computing device 102 may be any type of computing device that includes one or more processors (processor(s) 140), one or more memory devices (memory device(s) 142), and an operating system 144. The mobile computing device 102 may be a smartphone, a tablet, a wearable device, a laptop computer, or a desktop computer. In some implementations, the operating system 144 may be system software that manages computer hardware, software resources, and provides common services for computing programs.

In some implementations, the mobile computing device 102 may be a tablet, a smartphone, or a wearable. In these implementations, the operating system 144 may be referred to as a mobile operating system. The mobile operating system may be configured to execute on devices that, in general, include display devices that may be smaller in size than, for example, a display device included in a laptop computer or a desktop computer. In some implementations, the mobile computing device 102 may be a laptop computer. In these implementations, the operating system may be referred to as a laptop or desktop operating system. In these implementations, the operating system 144 may be an operating system designed for a display that is larger in size than that included in a tablet, a smartphone, or a wearable.

In some implementations, the media adapter 107 (e.g., a casting device, a media streaming device, a media streaming player) may be interfaced with or connected to the network-connected display device 104. The media adapter 107 may interact with and communicate with the media content providers 160, the server computer 106, and the mobile computing device 102 when providing media content to the network-connected display device 104. In some implementations, the media adapter 107 may be embedded in and/or an integrated part of the network-connected display device 104.

The media content providers 160 may include a variety of streaming service and media content sources and service platforms. The media adapter 107 may facilitate providing (e.g., streaming) media content (e.g., streaming video such as movies, TV shows, etc.) from one or more streaming services included in the media content providers 160 to the network-connected display device 104. For example, the media adapter 107 may directly connect to a connector on the network-connected display device 104 by way of connection 165. The media adapter 107 may provide digital video and/or audio to the network-connected display device 104. For example, the media adapter 107 may connect to a high-definition multimedia interface (HDMI) connector included in the network-connected display device 104. Examples of the media adapter 107 may include, but are not limited to, a set-top box, a television box, and a streaming media adapter.

The user 101 may connect to and interact with the media adapter 107 using the TV application 110 installed on the mobile computing device 102. The user, interacting with the TV application 110, may select streaming services (e.g., free services, subscription-based services) for viewing media content on the network-connected display device 104. As described, the media adapter 107 can facilitate the interface between the media content providers 160 and the network-connected display device 104 that the user 101 uses to view media content (e.g., streaming media content, movies, TV shows, etc.).

In some implementations, the mobile computing device 102 may connect to or interface with the media adapter 107 by way of a wireless communication link 163b. Wireless communication links 163a-e may be short-range wireless connections such as a Bluetooth connection. In some examples, wireless communication links 163a-e may be a Wi-Fi (e.g., direct Wi-Fi) connection.

The media adapter 107 may be any type of computing device that includes one or more processors (processor(s) 170), one or more memory devices (memory device(s) 172), and an operating system 174. In some implementations, the processor(s) 170 may include a system on a chip (SoC). The SoC may include a central processing unit (CPU), a graphic processing unit (GPU), one or more memory interfaces, and one or more input/output interfaces and devices. In some implementations, the operating system 174 may be system software that manages computer hardware, software resources, and provides common services for computing programs.

The network-connected display device 104 may include the unified television application 130. The unified television application 130 may keep a record of the interactions of the user with the media content in the media content recommendation stream received from the server computer 106 for display in one or more rows in the user interface 112. The network-connected display device 104 may send the record of the interactions to the server computer 106 for use in determining media content recommendations for the user.

In some implementations, the network-connected display device 104 may be configured to execute the unified television application 130. For example, the network-connected display device 104 may be a smart television. For example, a smart television may be a network-connected television that may connect to media content providers (e.g., media content providers 160) by way of a network (e.g., the network 150). The media content providers may source media content to the smart television. In these implementations, a user may interact with the unified television application 130 to access media content from the media content providers 160. The unified television application 130 may interface with the server computer 106, and specifically with the server-side TV application 116. The unified television application 130 may provide similar functionality to the user as that provided by an application executing on the media adapter 107. For example, executing the unified television application 130 by the network-connected display device 104 allows the network-connected display device 104 to obtain a media content recommendation stream from the server computer 106.

The network-connected display device 104 may be configured to connect to the network 150. In some implementations, the network-connected display device 104 is a television (e.g., a smart television (TV)). The network-connected display device 104 may include one or more processors (processor(s) 156), one or more memory devices (memory device(s) 152), and an operating system (OS) 154. The operating system 154 may execute (or assist with executing) the unified television application 130.

In some implementations, the operating system 154 may be a browser application. A browser application is a web browser configured to access information on the Internet by way of a network (e.g., the network 150). A browser application may launch one or more browser tabs in the context of one or more browser windows in the browser application. In some implementations, the operating system 154 is a Linux-based operating system configured to execute (or assist with executing) the unified television application 130.

The system 100 may include one or more server computers (e.g., the server computer 106) configured to interface with the mobile computing device 102, the media adapter 107, the media content providers 160, and the network-connected display device 104 by way of the network 150. In some implementations, the network 150 may establish a wireless communication link between the network-connected display device 104, the mobile computing device 102, the media adapter 107, the media content providers 160, and the server computer 106.

The server computer 106 may include a unified media platform (UMP) 158. The UMP 158 may contribute to the managing of media content recommendations. The UMP 158 may manage the providing of the media content associated with the media content recommendations to the network-connected display device 104. In some implementations, the UMP 158 may manage the providing of the media content associated with the media content recommendations from the media content providers 160 to the mobile computing device 102.

The UMP 158 may provide a media content recommendation stream as described herein to the network-connected display device 104. In some implementations, the UMP 158 may provide the media content recommendation stream to the media adapter 107, which in turn streams the selected media content from the media content providers 160 to the network-connected display device 104. In response to receiving an indication of a selection from the media content recommendations, the server-side television application 116 may enable display of the media content on the display 132. In some implementations, the UMP 158 may function as a centralized media content management module configured to provide the media content recommendations to the mobile computing device 102.

The server computer 106 may include a knowledge module 166. The knowledge module 166 may include information associated with media content items provided by the media content providers 160. In some implementations, the knowledge module 166 may generate media content recommendations for associating with an account of a user based, in part, on a multi-dimensional user activity characteristic associated with the account of the user and the information associated with media content items provided by the media content providers 160. The user activity characteristic associated with the account of the user may be obtained from a plurality of information sources that may include, but are not limited to, a search engine, a mapping application, and an online retailer. The information sources may provide activity data related to activities of the account of the user by way of a respective software program or application.

Figure 2:
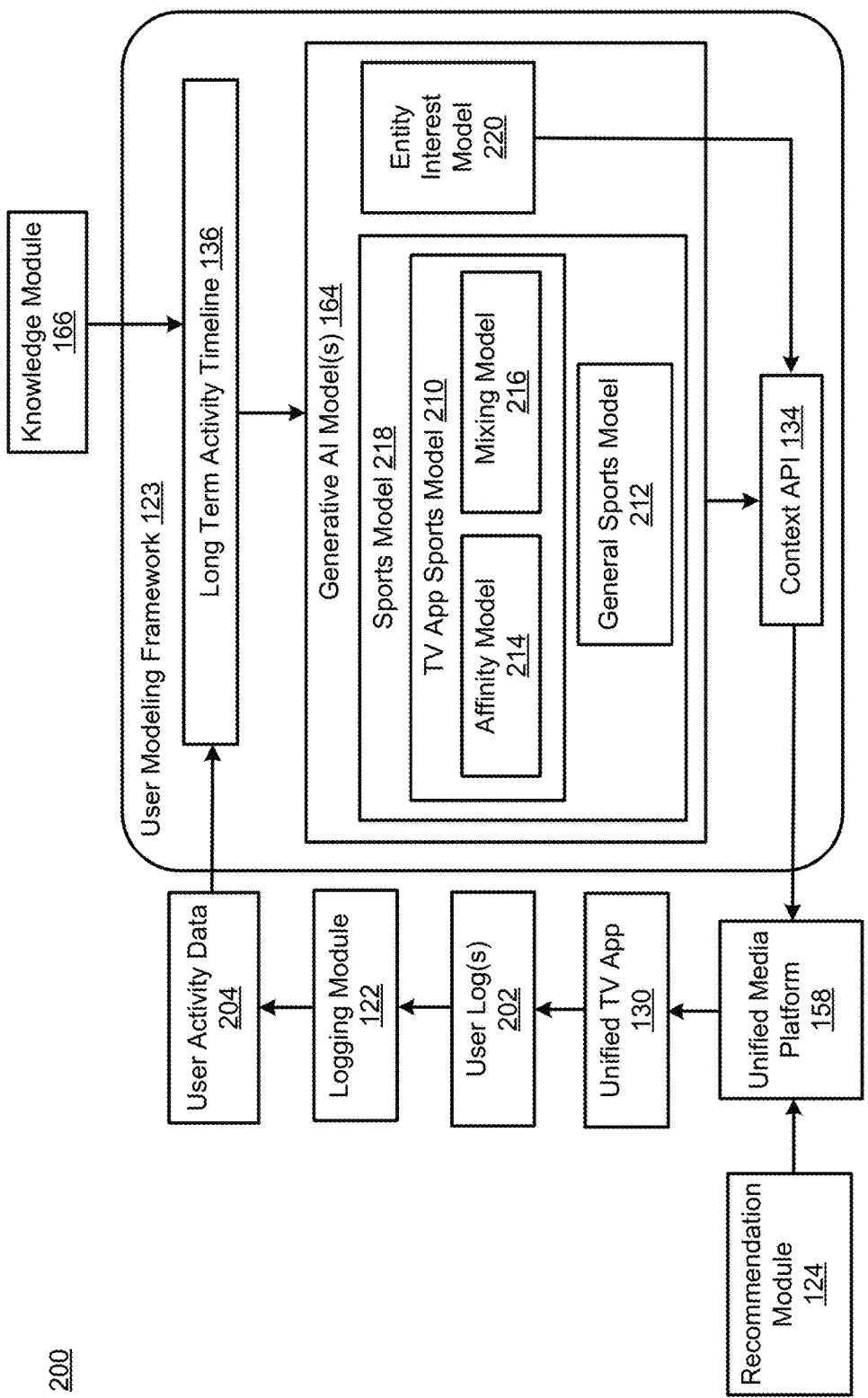
FIG. 2 is a block diagram of an example process flow for determining sports related media content for recommending to a user according to implementations described throughout this disclosure.

FIG. 2 is a block diagram of an example process flow 200 which may be implemented by the system 100 for determining sports related media content for recommending to a user according to implementations described throughout this disclosure. Referring to FIGS. 1A-D and 2, for example, the knowledge module 166 may interface with a user modeling framework 123 to provide information and data to the user modeling framework 123 for use by the system 100 in determining inter-ranked sports related media content recommendations and/or co-ranked sports and non-sports related media content recommendations for a user (e.g., the user 101). In some implementations, the unified television application 130 may interface with the knowledge module 166 to provide information and data related to the past activities of the user when interacting with the unified television application 130, the viewing history of the user, and/or the popularity of sports related media content items.

The server computer 106 may include a recommendation module 124. The recommendation module 124 may interface with the knowledge module 166 and an artificial intelligence (AI) module 194 to determine recommended media content for consumption by a user. The UMP 158 may interface with the recommendation module 124 and the user modeling framework 123 to provide sports related and non-sports related media content for recommendation to the user. In some implementations, the recommendation module 124 may provide a score or other type of indication that relates to an affinity of the user for the recommended media content item. In some implementations, media content providers may implement a different scoring scales and processes. In these implementations, the system 100 may find it difficult to rank the media content items relative to one another if the scores are provided by different media content providers. As will be described in more detail herein, the system 100 may apply a normalization algorithm to the media content provider scores so that the recommended media content items may be inter-ranked and/or co-ranked.

The server computer 106 may include a logging module 122. The logging module 122 may implement a logging pipeline. In some implementations, the logging module 122 may receive user log(s) 202 (e.g., one or more log file) from the unified television application 130 executing on the network-connected display device 104. The network-connected display device 104 may provide the user log(s) 202 to the server computer 106 by way of the network 150. The user log(s) 202 may include information and data related to user activity with the unified television application 130. The logging module 122 may parse or read the user log(s) 202 to derive metadata based on the information and data related to user activity with the unified television application 130. The logging module 122 may provide the metadata as user activity data 204 to the user modeling framework 123. The system 100 may use the user activity data 204 when inter-ranking and/or co-ranking sports related media content and non-sports related media content.

The server computer 106 may include the user modeling framework 123. The user modeling framework 123 may be implemented to help build and/or serve models (e.g., generative artificial intelligence (AI) model(s) 164) for a user and user content using a context application programming interface (API) 206. The models may be based on and derived from input received from the knowledge module 166 and the user activity data 204. The models (e.g., generative artificial intelligence (AI) model(s) 164) may be trained using machine learning and generative artificial intelligence algorithms and processes.

The user modeling framework 123 may include a data store that aggregates information and data related to activities of a user (e.g., the user 101) with a plurality of information sources that may include, but are not limited to, search engines, mapping applications, online retailers, virtual assistants, television applications, and a variety of media content providers. The information sources may provide activity data related to activities of the account of the user by way of a respective software program or application. For example, the logging module 122 may provide the user activity data 204 to a long term activity timeline 136 included in the user modeling framework 123. The knowledge module 166 may provide information and data related to multi-dimensional user activity characteristics associated with the account of the user and the information associated with media content items provided by the media content providers 160 to the long term activity timeline 136.

The long term activity timeline 136 may provide the information and data received from the knowledge module 166 to the generative AI model(s) 164 for use in training an entity interest model 220. The entity interest model 220 may model user interest in non-sports related media content that may include, but is not limited to, a search activity or search history of a user with a web browser application, a watch history of a user for short form videos, shared videos, and other types of personalized media content provided by a variety of media content providers along with the multi-dimensional user activity characteristics associated with the account of the user.

In some implementations, the long term activity timeline 136 may add to or enrich the user activity data 204 resulting in enriched or augmented metadata that the long term activity timeline 136 may provide to the generative AI model(s) 164. For example, the user activity data 204 may indicate that the user 101 shows interest in a sports-related media content item. The long term activity timeline 136 may enrich or augment the metadata received from the logging module 122 (e.g., the user activity data 204) to include additional information and data related to the sports related media content such as a sports type, a sports team, and/or a sports league associated with the sports-related media content item.

The long term activity timeline 136 may provide the enriched metadata for the user activity data 204 to the generative AI model(s) 164 for use in training a TV application sports model 210 included as part of a sports model 218. The sports model 218 may model user interest in sports related media content. The TV application sports model 210 may model user affinity for live sports related media content and/or sports related media content as provided by the unified television application 130.

In some implementations, the long term activity timeline 136 may add to or enrich the information and data received from the knowledge module 166 resulting in enriched or augmented metadata that the long term activity timeline 136 may provide to the generative AI model(s) 164. For example, the knowledge module 166 may provide metadata related to an affinity of the user for sports. The long term activity timeline 136 may enrich or augment the metadata received from the knowledge module 166 to include additional information and data related to the sports the user shows an interest in such as a sports type of interest to the user, a sports team of interest to the user, and/or a sports league of interest to the user.

The long term activity timeline 136 may provide the enriched metadata from the knowledge module 166 to the generative AI model(s) 164 for use in training a general sports model 212 included as part of a sports model 218. The sports model 218 may model user interest in sports related media content as well as an affinity of the user for sports related media content in general. The general sports model 212 may model a user affinity for sports in general based on the enriched metadata from the knowledge module 166.

In some implementations, the AI module 194 and the server-side TV application 116 may interface with the user modeling framework 123 to determine recommended media content for viewing by a user. For example, as described herein, the user modeling framework 123 may aggregate information and data provided the knowledge module 166 and the user activity data 204 to build, update, train, and maintain generative artificial intelligence (AI) model(s) 164 for use in determining recommended inter-ranked sports related media content for consumption by the user 101. For example, in addition or in the alternative as described herein, the user modeling framework 123 may use information and data provided the knowledge module 166, and the user activity data 204 along with generative artificial intelligence model(s) 164 to determine recommended co-ranked sports related media content and non-sports related media content for consumption by the user 101.

The server computer 106 may include the artificial intelligence (AI) module 194. The AI module 194 may receive information and data from the mobile computing device 102 and/or the network-connected display device 104 to build the generative AI model(s) 164 for use by the AI module 194. In some implementations, the AI module 194 may provide the server-side TV application 116 with a plurality of recommended media content items directed towards fulfilling requests by the mobile computing device 102 and/or the network-connected display device 104.

The server-side TV application 116 may interact with the context API 134 to generate a media content recommendation stream as a sequence of selectable information items that correspond to the plurality of recommended media content items. For example, the sequence of selectable information items may be served from the server computer 106 to the network-connected display device 104. The sequence of selectable information items may be sent or provided to the unified television application 130.

In some implementations, the media content recommendation stream may be a sequence of selectable information items that correspond to inter-ranked sports related media content items. The selectable information items may be for a ranked list of sports related media content items. In these implementations, the server-side TV application 116 may interface with an inter-ranking module 127. The inter-ranking module 127 may perform an inter-ranking of the recommended sports-related media content items as determined by the AI module 194. The inter-ranking module 127 may rank sports-related media content items in a hierarchy with the more preferred media content items ranked higher.

In some implementations, the media content recommendation stream may be a sequence of selectable information items that correspond to co-ranked sports related and non-sports related media content items. In these implementations, the server-side TV application 116 may interface with a co-ranking module 128. The co-ranking module 128 may perform a co-ranking of the recommended sports-related media content items and the recommended non-sports related media content items as determined by the AI module 194. The co-ranking module 128 may rank the media content items in a hierarchy with the more preferred media content items ranked higher.

The TV application sports model 210 may include a sports affinity model 214 and a sports mixing model 216. The sports affinity model 214 may model an affinity of a user with different types of sports entities. The sports entities may include, but are not limited to, a sports team, a type of sport, and a sport league. In some implementations, the inter-ranking module 127 may use the sports affinity model 214 to determine and/or select and inter-rank sports related media content for recommending to a user. The sports mixing model 216 may model an affinity of a user for mixing sports related media content with non-sports related media content for viewing by the user. In some implementations, the co-ranking module 128 may use the sports mixing model 216 to determine and/or select and co-rank sports related media content with non-sports related media content such as moves, TV shows, live news, etc. with sporting events for recommending to a viewer for live or "on now" TV viewing.

Referring to FIG. 1D, the server computer 106 may include a scoring module 129. The inter-ranking module 127 and/or the co-ranking module 128 may interface with the scoring module 129 when ranking media content items. For example, the scoring module 129 may determine a score associated with a media content item that may represent an affinity of the user for the media content item. In some implementations, media content providers may provide the user affinity score for the media content item. Each media content provider may base a score on a different scale or criteria. The scoring module 129 may implement various algorithms and/or processes to normalize the scores so that the scores may be used to inter-rank and/or co-rank the media content items.

The mobile computing device 102 may include the mobile computing device display 108. In some implementations, the mobile computing device display 108 is a display device such as a liquid crystal display (LCD), a light-emitting diode (LED) display, an organic light-emitting diode (OLED) display, or an active-matrix organic light-emitting diode (AMOLED) display. The network-connected display device 104 may include the display 132. In some implementations, the display 132 is a display device such as a liquid crystal display (LCD), a light-emitting diode display (LED) display, a plasma display, a quantum dot light-emitting diode display (QLED) display, or an organic light-emitting diode (OLED) display.

The processor(s) 156, the processor(s) 140, the processor(s) 170, and the processor(s) 180 may be formed in a substrate configured to execute one or more machine executable instructions or pieces of software, firmware, or a combination thereof. The processor(s) 156, the processor(s) 140, the processor(s) 170, and the processor(s) 180 may be semiconductor-based. For example, the processor(s) 156, the processor(s) 140, the processor(s) 170, and the processor(s) 180 may include semiconductor material that can perform digital logic.

The memory device(s) 152, the memory device(s) 142, the memory device(s) 172, and the memory device(s) 182 may include main memory that stores information in a format that can be read and/or executed by the processor(s) 156, the processor(s) 140, the processor(s) 170, and the processor(s) 180 respectively. The memory device(s) 152, the memory device(s) 142, the memory device(s) 172, and the memory device(s) 182 may include one or more random-access memory (RAM) devices and/or one or more read-only memory (ROM) devices.

The memory device(s) 152, memory device(s) 142, the memory device(s) 172, and the memory device(s) 182 may store applications that, when executed by the processor(s) 156, the processor(s) 140, the processor(s) 170, and the processor(s) 180, respectively, perform operations. For example, the memory device(s) 142 may store the operating system 144 and the TV application 110 that, when executed by the processor(s) 140, may perform operations on the mobile computing device 102. For example, the memory device(s) 152 may store the operating system 154 and the unified television application 130 that, when executed by the processor(s) 156, may perform operations on the network-connected display device 104.

In some implementations, the memory device(s) 182 may represent any kind of (or multiple kinds of) memory (e.g., RAM, flash, cache, disk, tape, etc.). In some implementations, the memory device(s) 182 may include external storage, e.g., memory physically remote from but accessible by the server computer 106. The server computer 106 may include one or more modules, engines, or applications representing specially programmed software. In some implementations, the server computer 106 may include the operating system 184, the server-side TV application 116, the knowledge module 166, the user modeling framework 123, the logging module 122, the inter-ranking module 127, the co-ranking module 128, the UMP 158, the recommendation module 124, the scoring module 129, processor(s) 180, and memory device(s) 182. For example, the memory device(s) 182 may store the operating system 184, the server-side TV application 116, the knowledge module 166, the user modeling framework 123, the logging module 122, the inter-ranking module 127, the co-ranking module 128, the UMP 158, the scoring module 129, and the recommendation module 124 that, when executed by the processor(s) 180, may perform operations on server computer 106 to implement one or more of the methods and processes described herein.

The network 150 may include the Internet and/or other types of data networks, such as a local area network (LAN), a wide area network (WAN), a cellular network, satellite network, or other types of data networks. The network 150 may also include any number of computing devices (e.g., computer, servers, routers, network switches, etc.) that are configured to receive and/or transmit data within the network 150. The network 150 may further include any number of hardwired and/or wireless connections. The network 150 may be, for example, communications networks having one or more types of topologies, including but not limited to the Internet, intranets, local area networks (LANs), cellular networks, Ethernet, Storage Area Networks (SANs), telephone networks, and Bluetooth personal area networks (PAN). In some implementations, two or more devices in a sub-network may be coupled by way of a wired connection, while at least some of the devices in the same sub-network are coupled by way of a local radio communication network (e.g., ZigBee, Z-Wave, Insteon, Bluetooth, Wi-Fi and other radio communication networks).

Figure 3:
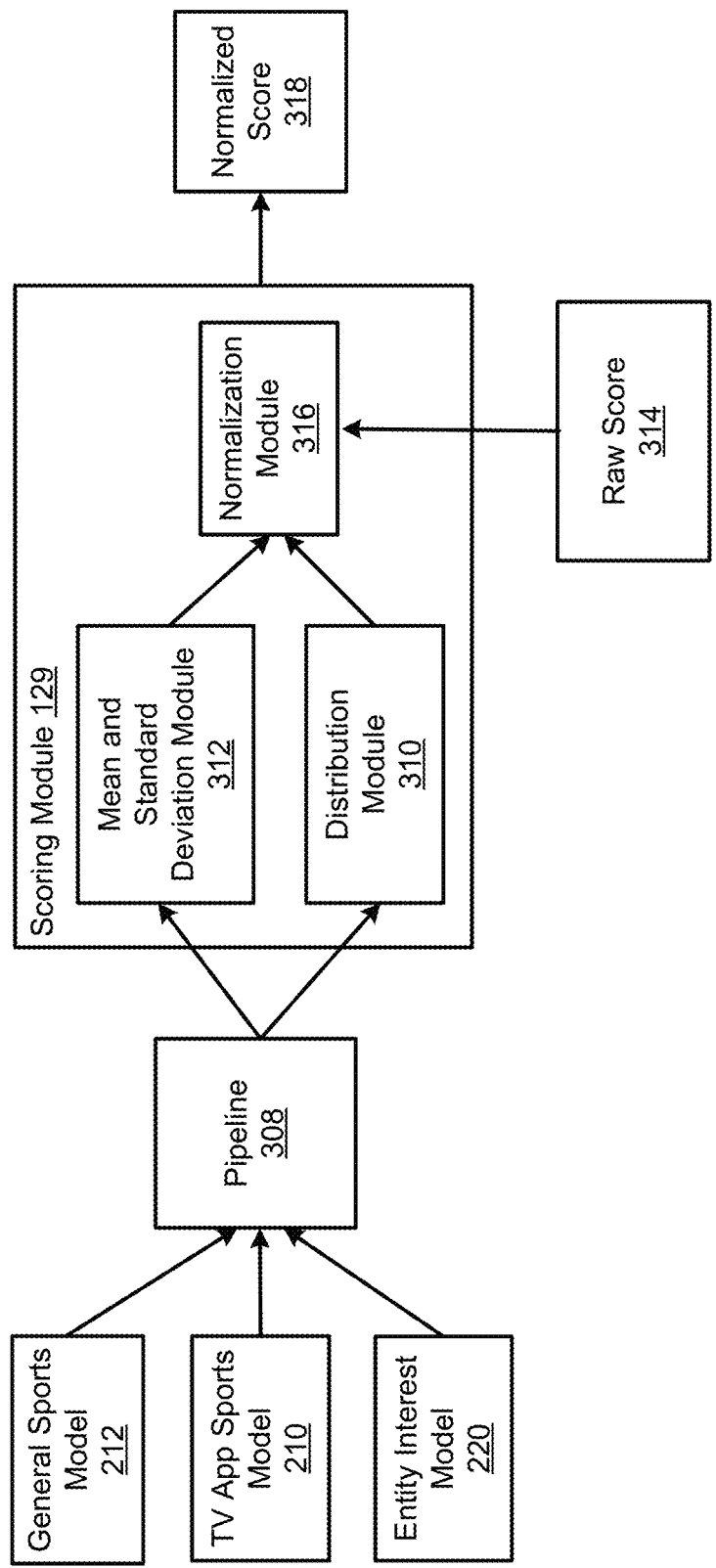
FIG. 3 is a block diagram of an example process for determining normalized scores for sports related and non-sports related media content that may be inter-ranked, and/or co-ranked according to implementations described throughout this disclosure.

FIG. 3 is a block diagram of an example process 300 for determining normalized scores for sports related and non-sports related media content that may be inter-ranked, and/or co-ranked according to implementations described throughout this disclosure. The example process 300 is described with reference to FIG. 1D.

The example process 300 may use scores from models from various sources. Each source may score or provide information for media content items using different models and/or different criteria. Therefore, various algorithms and processes may be applied to the scores so that the media content associated with the scores may be more easily inter-ranked and/or co-ranked. A general sports model 212 may provide scores and/or information and data related to media content related to sports. A TV application sports model 210 may provide scores and/or information and data related to sports-related media content items that a user clicks on or selects for viewing in a TV application (e.g., the unified television application 130). An entity interest model 220 may provide scores and/or information and data related to entities of interest to a user that may include both sports related media content and non-sports related media content.

A pipeline 308 may receive the scores and/or information and data from the general sports model 212, the TV application sports model 210, and the entity interest model 220. The pipeline 308 may facilitate the flow of data between the general sports model 212, the TV application sports model 210, the entity interest model 220, and the scoring module 129. The scoring module 129 may include a mean and standard deviation module 312 and a distribution module 310. The pipeline 308 may facilitate the sorting of the scores and/or information and data into the mean and standard deviation module 312 and the distribution module 310. The general sports model 212, the TV application sports model 210, and the entity interest model 220 may be models that include collections or bodies of knowledge and data that may be encoded for open-ended retrieval tasks by the pipeline 308.

The scoring module 129 may use the general sports model 212, the TV application sports model 210, and the entity interest model 220 when normalizing a received raw score 314. For example, the mean and standard deviation module 312 may determine a mean and standard deviation for the various types of scores and/or information and data received from the pipeline 308. The mean and standard deviation module 312 may provide the mean and standard deviation for the scores and/or information and data to a normalization module 316. The distribution module 310 may determine a distribution for the various types of scores and/or information and data. The distribution module 310 may provide the distribution to the normalization module 316. The normalization module 316 may apply processes and/or algorithms to the raw score 314 using the received mean and standard deviation for the scores and the received distribution for the various types of scores.

The normalization module 316 may normalize scores from different models and sources (e.g., the raw score 314) generating a normalized score 318. The systems and methods described herein may use the normalized score 318 to inter-rank sports related media content and/or to co-rank sports related media content and non-sports related media content. In some implementations, the normalized score 318 may be a sports score.

Figure 4:
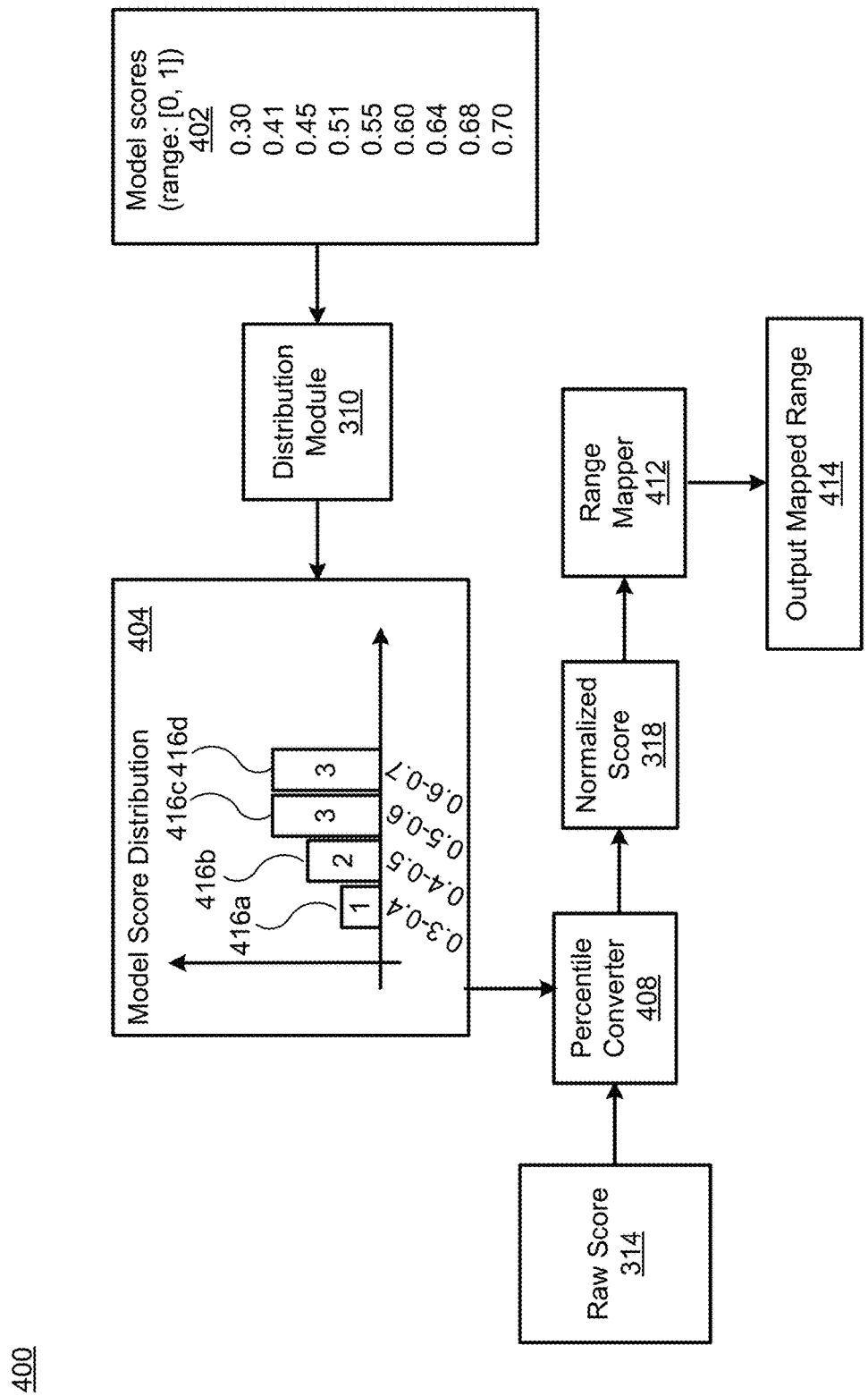
FIG. 4 is a block diagram of an example process for inter-ranking sports related media content items for recommending to a user according to implementations described throughout this disclosure.

FIG. 4 is a block diagram of an example process 400 for inter-ranking sports related media content items for recommending to a user according to implementations described throughout this disclosure. For example, referring to FIGS. 1D and 3, the inter-ranking module 127 may perform the process 400. The scoring module 129 may generate the normalized score 318 for use by the process 400.

In some implementations, the pipeline 308 may provide scores for models from different media providers and sources, and different corpuses as described herein and as shown for example in FIG. 3. In the example shown in FIG. 4, the pipeline 308 may provide scores 402 for a first model to the distribution module 310. The first model provides scores 402 in a range from 0 to 1.0. In another example, a model may provide scores in a range from 0 to 100. The scores represent the affinity of users for a media content category. For example, for sports related media content, the categories may include, but are not limited to, a sports type, a sports team, and a sports league. The scores may be for media content that is a sporting event of a particular type (e.g., football) and league (e.g., NFL) that may involve two teams (e.g., Team 1 and Team 2). In the example shown in FIG. 4, the scores 402 may be from ten users and may indicate an affinity of the user for a sports team (e.g., a score representative of how much the user likes the sports team).

The distribution module 310 may generate a model score distribution 404. For example, the model score distribution 404 shows a number of users that scored media content category information in a range. In the example shown in FIG. 4, the process 400 defined four distribution ranges 416a-d. One user ranked the attribute or category for the sports related media content in a first distribution range 416a. Two users ranked the attribute or category for the sports related media content in a second distribution range 416b. Two users ranked the attribute or category for the sports related media content in a third distribution range 416c. Three users ranked the attribute or category for the sports related media content in a fourth distribution range 416d.

A percentile converter 408 converts the scores to percentile scores so that scores from different models may be more easily compared to one another. In the example shown in FIG. 4, the process 400 defined four distribution ranges 416a-d. In some implementations, more than four distribution ranges or buckets may be defined (e.g., six, eight or ten). The accuracy of the converted percentile values may increase as the number of buckets increases.

The raw score 314 may be input to the percentile converter 408 and the percentile converter 408 may output a normalized score 318 for the raw score 314. In some implementations, the normalization module 316 may include the percentile converter 408. A range mapper 412 may map the normalized score 318 into an output mapped range 414 that may be one of three ranges: a high range, a medium range, or a low range. For example, the process 400 may define the three ranges based on the percentile scores. The high range may include percentile scores from 67 to 100 percent. The medium range (or mid-range) may include percentile scores from 34 to 66 percent. The low range may include percentile scores from zero to 33 percent.

In a non-limiting example, a media event may be associated with four attributes. Each attribute may be normalized and mapped using the process 400. For example, F(attribute 1)=HIGH; F(attribute 2)=MEDIUM; F(attribute 3)=LOW; F(attribute 4)=MEDIUM, where F=a function that normalizes the affinity scores (e.g., raw scores) of a user for each attribute for the media event using the process 400.

Referring to FIG. 1D, the inter-ranking module 127 may generate or create a tuple that represents the media event and provides an overall score for the media event. The tuple may be compared to other tuples for other media events when inter-ranking the media events. Equation 1 is an equation for a tuple that may represent a media event. The elements of the tuple are presented in an order of importance or range ranking.

$$[\text{Max}(F(\text{attribute 1}), F(\text{attribute 2})), \text{Min}(F(\text{attribute 1}), F(\text{attribute 2})), F(\text{attribute 3}), F(\text{attribute 4})] \quad \text{Equation 1:}$$

[High, Medium, Medium, Low]

Comparing two media events may include comparing the tuple of each event to one another. For example, a first tuple for a first media event may be lexicographically compared to a second tuple for a second media event when inter-ranking the media events. For example, a media event may be a sporting event. A first attribute for a sporting event may be a first team (e.g., attribute 1=Team 1). A second attribute for the sporting event may be a second team (e.g., attribute 2=Team 2). For example, Team 1 and Team 2 are playing each other in the sporting event. Referring to Equation 1, the use f the MAX function and the MIN function for attribute 1 and attribute 2 may indicate the importance of sports teams in relation to user affinity. A third attribute for the sporting event may be a sports type. A fourth attribute for the sporting event may be a sports league.

In some implementations, Equation 1 may use an average operator (AVG) in place of the MAX operator. The use of operators to determine a score for the attribute may be possible because the scores for the attributes have been normalized and may be compared to one another.

The example process 400 shows a first model that provides scores 402 in a range from 0 to 1.0. In another example, a second process similar to the example process 400 may use scores from a second model that may provide scores in a second range from 0 to 100. The second process may generate a score distribution for the second range of scores that may be input to a percentile converter, normalized, and range mapped allowing for the comparison of scores from different models.

Figure 5:
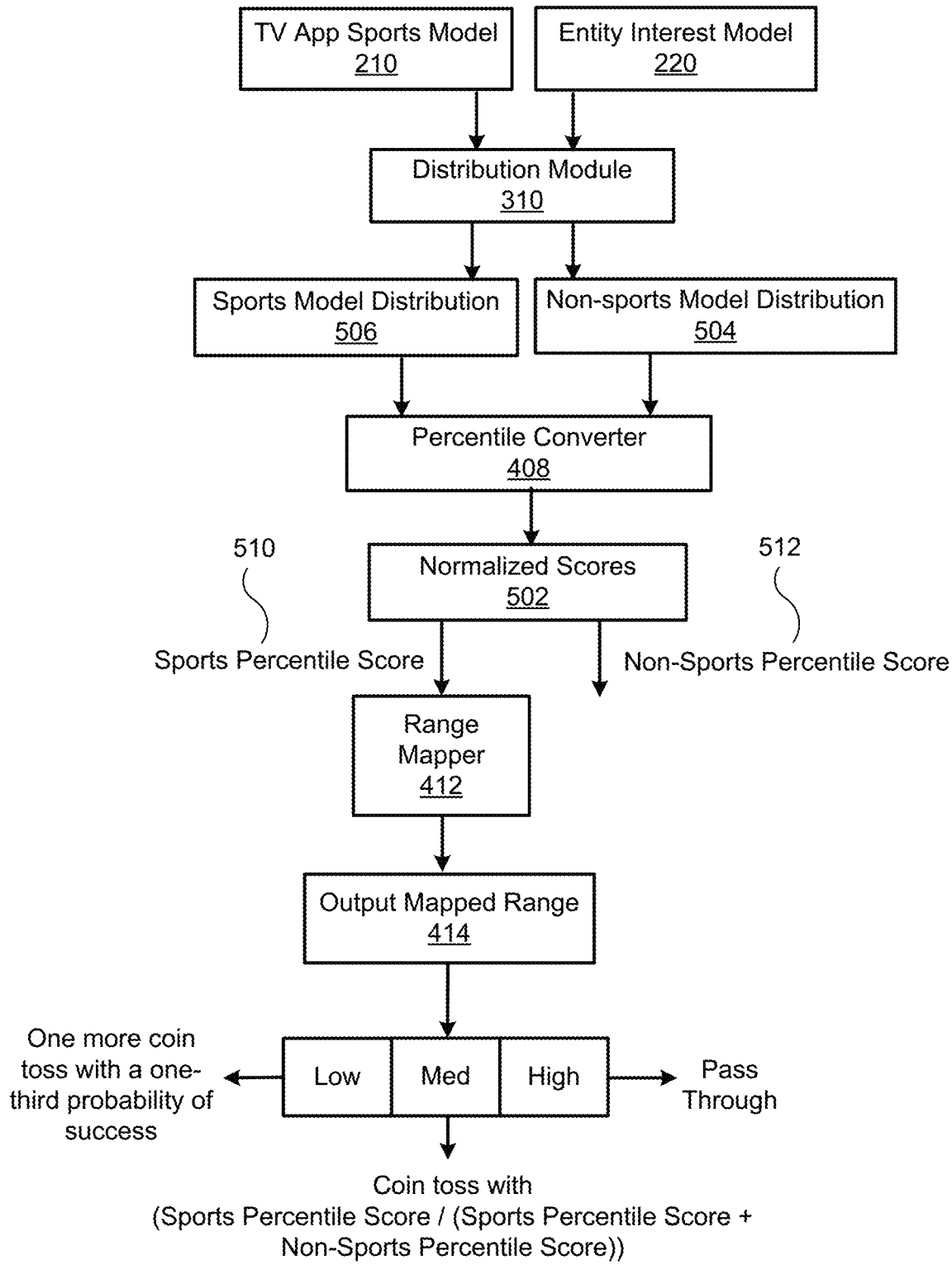
FIG. 5 is a block diagram of an example process for co-ranking sports related media content and non-sports related media content for recommending to a user according to implementations described throughout this disclosure.

FIG. 5 is a block diagram of an example process 500 for co-ranking sports related media content and non-sports related media content for recommending to a user according to implementations described throughout this disclosure. The process 500 may include normalizing scores for sports related media content and non-sports related media content using the example process 400 as described with reference to FIG. 4. The process 500 may include mapping the resultant percentile scores to low, medium, and high ranges as shown, for example, in FIG. 4.

Referring to FIG. 5, the TV application sports model 210 and the entity interest model 220 may be input to the distribution module 310 as described in FIGS. 3 and 4. The distribution module 310 for the process 500 may output a sports model distribution 506 and a non-sports model distribution 504. The sports model distribution 506 and the non-sports model distribution 504 may be input to the percentile converter 408. The percentile converter 408 may output normalized scores 502, which may include a sports percentile score 510 and a non-sports percentile score 512. The sports percentile score 510 may be input to the range mapper 412. The output mapped range 414 may be mapped to a low range, a medium range, or a high range.

If a sports related media content item is mapped to a high range (high user affinity), the sports related media content item will pass through and be chosen for recommendation and ranking higher than a non-sports related media content item. If the sports related media content item is mapped to a medium range (medium user affinity), the process may perform a coin toss as shown in Equations 2 and 3 below using the sports related media content percentile score (Sports Affinity Percentile) and the non-sports related media content percentile score (Non-Sports Affinity Percentile).

$$P(\text{Sports}) = \text{Sports Affinity Percentile}/(\text{Sports Affinity Percentile} + \text{Non-Sports Affinity Percentile}) \quad \text{Equation 2:}$$

$$P(\text{non-sports}) = 1 - P(\text{sports}) \quad \text{Equation 3:}$$

The process 500 may then choose either the sports related media content item or the non-sports related media content item based on the result of the coin toss (P (sports), the probability for recommending the sports related media content item, and P (non-sports), the probability for recommending the non-sports related media content item). If the sports related media content item is mapped to a low range (low user affinity), the process 500 may perform an additional or another coin toss. If the affinity for sports related media content is low, the process 500 may perform an additional or another coin toss apart from the coin toss as shown in Equations 2 and 3 where the probability of success is a one out of three. For example, this may occur because a user may have a low affinity for the sports related media content item and, in general, users with a low affinity for a sports related media content item may not want to watch the media content item.

Figure 6:
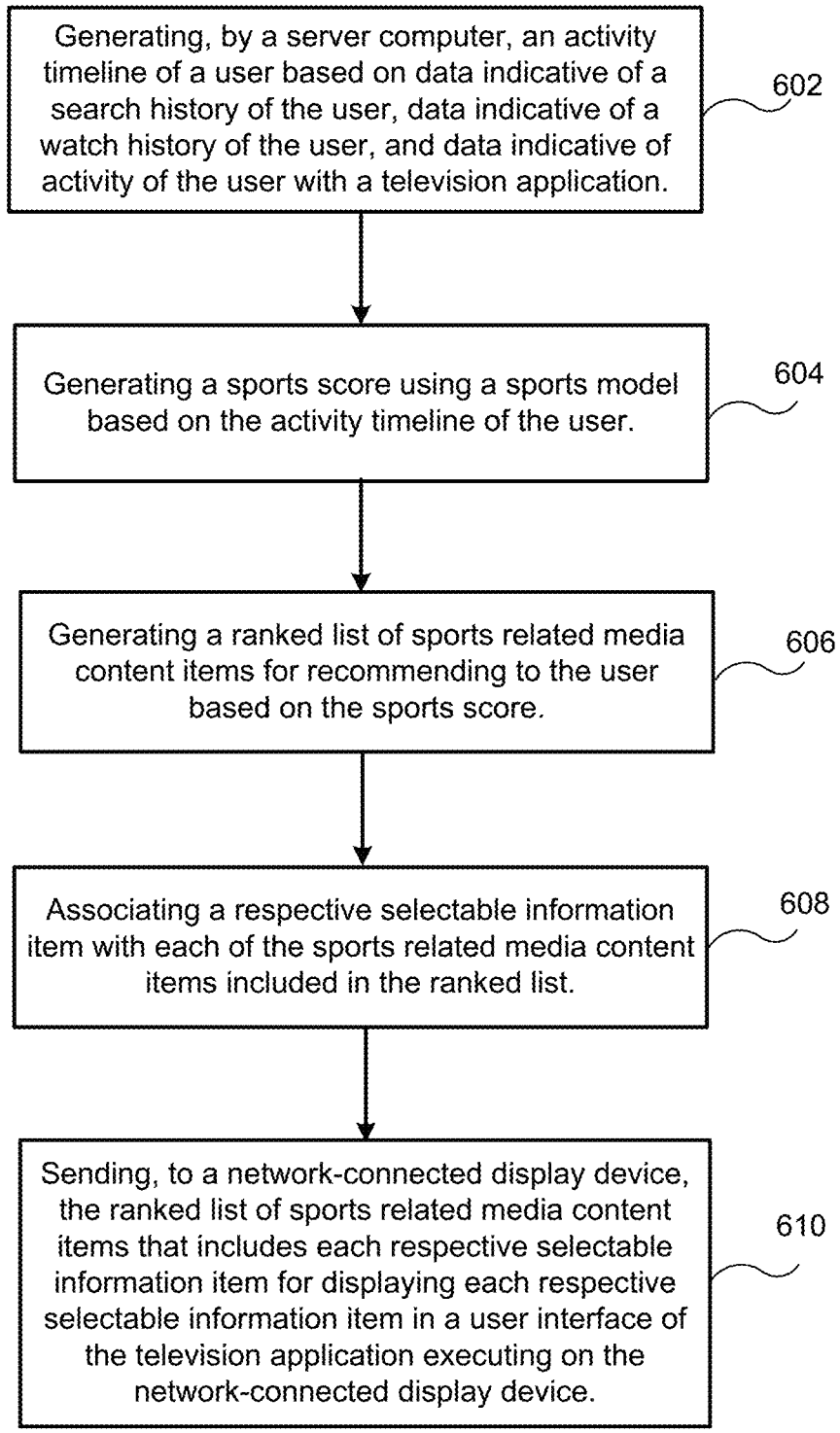
FIG. 6 illustrates a flowchart depicting example operations of recommending and providing sports related media content items to a user according to implementations described throughout this disclosure.

FIG. 6 illustrates a flowchart 600 depicting example operations of recommending and providing sports related media content items to a user according to implementations described throughout this disclosure. Although the flowchart 600 of FIG. 6 illustrates the operations in sequential order, it will be appreciated that this is merely an example, and that additional or alternative operations may be included. Further, operations of FIG. 6 and related operations may be executed in a different order than that shown, or in a parallel or overlapping fashion. The operations may define a computer-implemented method. Although the flowchart 600 is described with reference to the system 100 of FIG. 1D, the flowchart 600 may be executed according to any of the figures discussed herein. In some examples, the operations of the flowchart 600 are executed by server computer 106.

Operation 602 includes generating, by a server computer, an activity timeline of a user based on data indicative of a search history of the user, data indicative of a watch history of the user, and data indicative of activity of the user with a television application.

Operation 604 includes generating a sports score using a sports model based on the activity timeline of the user.

Operation 606 includes generating a ranked list of sports related media content items for recommending to the user based on the sports score.

Operation 608 includes associating a respective selectable information item with each of the sports related media content items included in the ranked list.

Operation 610 includes sending, to a network-connected display device, the ranked list of sports related media content items that includes each respective selectable information item for displaying each respective selectable information item in a user interface of the television application executing on the network-connected display device.

In some examples, the techniques described herein relate to a method including: generating, by a server computer, an activity timeline of a user based on data indicative of a search history of the user, data indicative of a watch history of the user, and data indicative of activity of the user with a television application; generating a sports score using a sports model based on the activity timeline of the user; generating a ranked list of sports related media content items for recommending to the user based on the sports score; associating a respective selectable information item with each of the sports related media content items included in the ranked list; and sending, to a network-connected display device, the ranked list of sports related media content items that includes each respective selectable information item for displaying each respective selectable information item in a user interface of the television application executing on the network-connected display device.

In some examples, the techniques described herein relate to a method, further including generating a television (TV) application sports model using the activity timeline of the user.

In some examples, the techniques described herein relate to a method, further including generating a general sports model using the activity timeline of the user.

In some examples, the techniques described herein relate to a method, wherein the sports model includes the TV application sports model and the general sports model.

In some examples, the techniques described herein relate to a method, wherein the TV application sports model includes a sports affinity model and a sports mixing model.

In some examples, the techniques described herein relate to a method, wherein the sports affinity model models an affinity of the user for sports related categories.

In some examples, the techniques described herein relate to a method, wherein the sports related categories include a type of sport, a team, and a league.

In some examples, the techniques described herein relate to a method, further including inter-ranking sports related media content items using the sports affinity model, the inter-ranking including: determining, for each sports related media content item, attributes of the sports related media content item that are associated with the sports related categories; and mapping the attributes to a range representative of a user affinity for the sports related media content item.

In some examples, the techniques described herein relate to a method, wherein the mapping includes applying an inter-ranking process that normalizes affinity scores obtained from media content providers of the sports related media content items.

In some examples, the techniques described herein relate to a method, further including selecting media content for a sporting event for recommending to the user based on the inter-ranking.

In some examples, the techniques described herein relate to a method, wherein the sports mixing model models an affinity of the user for mixing sports related media content items with non-sports related media content items.

In some examples, the techniques described herein relate to a method, further including co-ranking sports related media content items with non-sports related media content items using the sports mixing model, the co-ranking including applying a co-ranking process that normalizes affinity scores obtained from media content providers of the sports related media content items and the non-sports related media content items.

In some examples, the techniques described herein relate to a method, further including receiving, by the server computer and from a logging pipeline, data indicative of the activity of the user with the television application.

In some examples, the techniques described herein relate to a method, wherein the logging pipeline determines the data indicative of the activity of the user from a user log received from the network-connected display device.

In some examples, the techniques described herein relate to a non-transitory computer-readable medium storing executable instructions that when executed by at least one processor of a server computer cause the at least one processor to execute operations, the operations including: generating an activity timeline of a user based on data indicative of a search history of the user, data indicative of a watch history of the user, and data indicative of activity of the user with a television application; generating a sports score using a sports model based on the activity timeline of the user; generating a ranked list of sports related media content items for recommending to the user based on the sports score; associating a respective selectable information item with each of the sports related media content items included in the ranked list; and sending, to a network-connected display device, the ranked list of sports related media content items that includes each respective selectable information item for displaying each respective selectable information item in a user interface of the television application executing on the network-connected display device.

In some examples, the techniques described herein relate to a non-transitory computer-readable medium, further including generating a television (TV) application sports model using the activity timeline of the user.

In some examples, the techniques described herein relate to a non-transitory computer-readable medium, further including generating a general sports model using the activity timeline of the user.

In some examples, the techniques described herein relate to a non-transitory computer-readable medium, wherein the sports model includes the TV application sports model and the general sports model.

In some examples, the techniques described herein relate to a non-transitory computer-readable medium, wherein the TV application sports model includes a sports affinity model that models an affinity of the user for sports related categories, and a sports mixing model.

In some examples, the techniques described herein relate to a system including: at least one processor; and a non-transitory computer-readable medium storing instructions that when executed by the at least one processor cause the system to: generate an activity timeline of a user based on data indicative of a search history of the user, data indicative of a watch history of the user, and data indicative of activity of the user with a television application; generate a sports score using a sports model based on the activity timeline of the user; generate a ranked list of sports related media content items for recommending to the user based on the sports score; associate a respective selectable information item with each of the sports related media content items included in the ranked list; and send, to a network-connected display device, the ranked list of sports related media content items that includes each respective selectable information item for displaying each respective selectable information item in a user interface of the television application executing on the network-connected display device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or non-transitory medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent example functional relationships and/or physical or logical couplings between the various elements. Many alternative or additional functional relationships, physical connections or logical connections may be present in a practical device. Moreover, no item or component is essential to the practice of the embodiments disclosed herein unless the element is specifically described as "essential" or "critical".

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, top, bottom, side, end, front, back, etc. herein are used with reference to a currently considered or illustrated orientation. If they are considered with respect to another orientation, it should be understood that such terms must be correspondingly modified.

Further, in this specification and the appended claims, the singular forms "a," "an" and "the" do not exclude the plural reference unless the context clearly dictates otherwise. Moreover, conjunctions such as "and," "or," and "and/or" are inclusive unless the context clearly dictates otherwise. For example, "A and/or B" includes A alone, B alone, and A with B.

Although certain example methods, apparatuses and articles of manufacture have been described herein, the scope of coverage of this patent is not limited thereto. It is to be understood that terminology employed herein is for the purpose of describing particular aspects and is not intended to be limiting. On the contrary, this patent covers all methods, apparatus and articles of manufacture fairly falling within the scope of the claims of this patent.

Further to the descriptions above, a user may be provided with controls allowing the user to make an election as to both if and when systems, programs, or features described herein may enable collection of user information (e.g., a user's preferences, a user's current location, a user's credentials, etc.), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

What is claimed is:

1. A method comprising:
   generating, by a server computer, an activity timeline of a user based on data indicative of a search history of the user, data indicative of a watch history of the user, and data indicative of activity of the user with a television application;
   generating a television (TV) application sports model, a general sports model, and an entity interest model using the activity timeline;
   determining normalized scores for sports related media content items and non-sports related media content items based on scores from the TV application sports model, scores from the general sports model, and scores from the entity interest model;
   generating a co-ranked list of the sports related media content items and the non-sports related media content items for recommending to the user based on the normalized scores;
   associating a respective selectable information item with each of the sports related media content items and the non-sports related media content items included in the co-ranked list; and
   sending, to a network-connected display device, the co-ranked list of the sports related media content items and the non-sports related media content items that includes each respective selectable information item for displaying in a user interface of the television application executing on the network-connected display device.

2. The method of claim 1, wherein the TV application sports model includes a sports affinity model that models an affinity of the user for sports related categories.

3. The method of claim 2, wherein the sports related categories include a type of sport, a team, and a league.

4. The method of claim 2, wherein generating the co-ranked list of the sports related media content items and the non-sports related media content items for recommending to the user based on the normalized scores comprises inter-ranking the sports related media content items using the sports affinity model, the inter-ranking comprising:
   determining, for each sports related media content item, attributes of the sports related media content item that are associated with the sports related categories; and
   mapping the attributes to a range representative of a user affinity for the sports related media content item comprising applying an inter-ranking process that normalizes affinity scores obtained from media content providers of the sports related media content items.

5. The method of claim 4, further comprising selecting media content for a sporting event for recommending to the user based on the inter-ranking.

6. The method of claim 4, wherein the TV application sports model further includes a sports mixing model that models an affinity of the user for mixing sports related media content items with non-sports related media content items.

7. The method of claim 6, wherein generating the co-ranked list of the sports related media content items and the non-sports related media content items for recommending to the user based on the normalized scores further comprises co-ranking sports related media content items with non-sports related media content items using the sports mixing model, the co-ranking comprising applying a co-ranking process that normalizes affinity scores obtained from media content providers of the sports related media content items and the non-sports related media content items.

8. The method of claim 1, further comprising receiving, by a logging pipeline included on the server computer, data indicative of the activity of the user with the television application.

9. The method of claim 8, wherein the logging pipeline determines the data indicative of the activity of the user from a user log received from the network-connected display device.

10. The method of claim 1, wherein the method further comprises:
receiving, by a logging pipeline included on the server computer, the scores from the TV application sports model, the general sports model, and the entity interest model; and
sorting, by the logging pipeline, the scores from the TV application sports model, the general sports model, and the entity interest model into a mean and standard deviation module and a distribution module.

11. The method of claim 10, wherein the method further comprises:
determining, by the mean and standard deviation module, a mean and standard deviation for the scores received from the logging pipeline; and
determining, by the distribution module, a distribution for the scores received from the logging pipeline.

12. The method of claim 11, wherein determining the normalized scores for the sports related media content items and the non-sports related media content items based on the scores from the TV application sports model, the scores from the general sports model, and the scores from the entity interest model comprises applying the mean and standard deviation and the distribution to the scores for the sports related media content items and the non-sports related media content items.

13. The method of claim 12, wherein determining the normalized scores for the sports related media content items and the non-sports related media content items based on the scores from the TV application sports model, the scores from the general sports model, and the scores from the entity interest model further comprises subsequent to applying the mean and standard deviation and the distribution to the scores for the sports related media content items and the non-sports related media content items, converting the scores for the sports related media content items and the non-sports related media content items into percentile scores.

14. The method of claim 13, further comprising mapping the normalized scores for the sports related media content items and the non-sports related media content items into an output mapped range based on the percentile scores.

15. A non-transitory computer-readable medium storing executable instructions that when executed by at least one processor of a server computer cause the at least one processor to execute operations, the operations comprising:

generating an activity timeline of a user based on data indicative of a search history of the user, data indicative of a watch history of the user, and data indicative of activity of the user with a television application;
generating a television (TV) application sports model, a general sports model, and an entity interest model using the activity timeline;
determining normalized scores for sports related media content items and non-sports related media content items based on scores from the TV application sports model, scores from the general sports model, and scores from the entity interest model;
generating a co-ranked list of the sports related media content items and the non-sports related media content items for recommending to the user based on the normalized scores;
associating a respective selectable information item with each of the sports related media content items and the non-sports related media content items included in the co-ranked list; and
sending, to a network-connected display device, the co-ranked list of the sports related media content items and the non-sports related media content items that includes each respective selectable information item for displaying in a user interface of the television application executing on the network-connected display device.

16. The non-transitory computer-readable medium of claim 15, wherein the TV application sports model includes a sports affinity model that models an affinity of the user for sports related categories.

17. The non-transitory computer-readable medium of claim 16, wherein generating the co-ranked list of the sports related media content items and the non-sports related media content items for recommending to the user based on the normalized scores comprises inter-ranking the sports related media content items using the sports affinity model, the inter-ranking comprising:
determining, for each sports related media content item, attributes of the sports related media content item that are associated with the sports related categories; and
mapping the attributes to a range representative of a user affinity for the sports related media content item comprising applying an inter-ranking process that normalizes affinity scores obtained from media content providers of the sports related media content items.

18. A system comprising:
at least one processor; and
a non-transitory computer-readable medium storing instructions that when executed by the at least one processor cause the system to:
generate an activity timeline of a user based on data indicative of a search history of the user, data indicative of a watch history of the user, and data indicative of activity of the user with a television application;
generate a television (TV) application sports model, a general sports model, and an entity interest model using the activity timeline;
determine normalized scores for sports related media content items and non-sports related media content items based on scores from the TV application sports model, scores from the general sports model, and scores from the entity interest model;
generate a co-ranked list of the sports related media content items and the non-sports related media content items for recommending to the user based on the normalized scores;

associate a respective selectable information item with each of the sports related media content items and the non-sports related media content items included in the co-ranked list; and send, to a network-connected display device, the co-ranked list of the sports related media content items and the non-sports related media content items that includes each respective selectable information item for displaying in a user interface of the television application executing on the network-connected display device.

19. The system of claim 18, wherein the TV application sports model includes a sports affinity model that models an affinity of the user for sports related categories.

20. The system of claim 19, wherein generating the co-ranked list of the sports related media content items and the non-sports related media content items for recommending to the user based on the normalized scores comprises inter-ranking the sports related media content items using the sports affinity model, the inter-ranking comprising:

determining, for each sports related media content item, attributes of the sports related media content item that are associated with the sports related categories; and mapping the attributes to a range representative of a user affinity for the sports related media content item comprising applying an inter-ranking process that normalizes affinity scores obtained from media content providers of the sports related media content items.

* * * * *